United States Patent [19]

Iwao et al.

[11] Patent Number: 5,618,990
[45] Date of Patent: Apr. 8, 1997

[54] INSPECTION SYSTEM FOR DETECTING A LEAKING LIQUID AND ENTERING AIR

[75] Inventors: Kenji Iwao, Numazu; Hiroshi Mochizuki, Susono, both of Japan

[73] Assignee: Kabushiki Kaisha Yakult Honsha, Tokyo, Japan

[21] Appl. No.: 527,599

[22] Filed: Sep. 13, 1995

[30] Foreign Application Priority Data

Sep. 14, 1994 [JP] Japan .................................. 6-219778

[51] Int. Cl.$^6$ .................. B07C 5/02; G01N 33/02; G01M 3/02

[52] U.S. Cl. .................... 73/40; 73/45.3; 73/41; 209/552; 209/591

[58] Field of Search ................ 73/40, 41, 40.5 R, 73/45.3; 209/552, 591

[56] References Cited

U.S. PATENT DOCUMENTS

| | | | |
|---|---|---|---|
| 3,132,508 | 5/1964 | Williams | 73/52 |
| 3,221,539 | 12/1965 | Evans et al. | 73/45.2 |
| 3,465,572 | 9/1969 | Covert | 73/49.2 |
| 3,805,593 | 4/1974 | Sandoz et al. | 73/41 |
| 4,081,991 | 4/1978 | Powers, Jr. | 73/41 |
| 4,103,776 | 8/1978 | Taniguchi et al. | 209/73 |
| 4,602,499 | 7/1986 | Norton et al. | 73/41 |
| 4,788,850 | 12/1988 | Buschor et al. | 73/49.2 |
| 5,163,313 | 11/1992 | Haas, Jr. et al. | 73/41 |
| 5,193,685 | 3/1993 | Trevithick | 209/3.1 |
| 5,284,252 | 2/1994 | Bonnet | 209/552 |

FOREIGN PATENT DOCUMENTS

0646086  8/1962  Canada .................. 209/591

*Primary Examiner*—Hezron E. Williams
*Assistant Examiner*—J. David Wiggins
*Attorney, Agent, or Firm*—Armstrong, Westerman, Hattori, McLeland & Naughton

[57] ABSTRACT

A conveyor line conveys plural containers. A first sampler means moves the containers to a position at which a leaking liquid inspection apparatus is provided. A second sampler moves the containers to a position at which the entering air inspection apparatus is provided. A first stopper interrupts the containers at a position of the first sampler. A second stopper interrupts the vessels at a position of the second sampler. A third stopper is provided on the upstream side of the first and second stopper.

7 Claims, 12 Drawing Sheets

* INTERRUPT ARTICLE FROM UPSTREAM

• LIFT DOWN STOPPER

* FEED ARTICLE I FROM UPSTREAM

Fig.5

• INTERRUPT ARTICLE I

Fig.6

- MOVE PEDESTAL
- COMPLETE SUCTIONED HOLD

Fig.7

- REVERSELY TURN, MOVE

*Fig.8*

- LIFT UP STOPPER
- COMPLETE SUCTIONED HOLD
- RELEASE INTERRUPTION OF OTHER ARTICLE FROM UPSTREAM

*Fig.9*

- RETURN PEDESTAL
- START INSPECTION

Fig.10

• FINISH INSPECTION

• MOVE PEDESTAL
• SUCTIONED HOLD
* INTERRUPT OTHER ARTICLE FROM UPSTREAM

Fig.12

• REVERSELY TURN, MOVE

Fig.13

• COMPLETE SUCTIONED HOLD

Fig.14

- RETURN PEDESTAL
- RELEASE INTERRUPTION OF OTHER ARTICLE FROM UPSTREAM

INSPECTION SYSTEM FOR DETECTING A LEAKING LIQUID AND ENTERING AIR

BACKGROUND OF THE INVENTION

1. Field of the Invention

The invention relates to an inspection system for judging the quality of a container made of a flexible material such as paper, and fed with, for example, drink (such as a lactic acid drink) therein, and more particularly, to be capable of facilitating a leaking liquid inspection and an entering air inspection on the same conveyor line at the same time.

2. Description of the Related Art

If liquid such as a lactic acid drink is fed into a container and leaks, various disadvantages will result. For example, a production area becomes unsanitary, facilities for transporting after shipment are contaminated, and further, consumers become dissatisfied when the leaky container is passed to the consumers.

The leaking of the contents is caused by various reasons. For example, the container may have a defect in itself, and/or, there is something wrong in a system for sealing the container after feeding the liquid therein.

In order to prevent the such-disadvantages caused by a liquid leak, the applicant has provided a leaking liquid inspection apparatus for detecting the liquid leak conveniently as disclosed in Japanese Patent Application Disclosure No. 5-124628. According to the aforementioned prior art, detection of a liquid leak can be made automatically, and therefore, automatization of the leaking liquid inspection can be attained. As compared with a manner of inspecting all subjects, since a sampling inspection is utilized, pressure reduction means and/or measuring means can be facilitated in a smaller scale, and/or, elimination (automatic elimination) of an inferior container can be made easier.

On the other hand, if air enters in the container, the amount of liquid fed into such the container is reduced proportionate to the amount of air in the container. As a result, various disadvantages result. For example, when the liquid is a drink, because the amount of drink is less than the regular amount, the consumer may be annoyed.

In order to minimize such disadvantages caused by the aforementioned entering air, the present applicant has provided an entering air inspection apparatus capable of reliably, quickly and automatically detecting air which enters a container when the liquid is fed into the container as disclosed in Japanese Patent Application Disclosure No. 5-124629 (also the container may be flexible). According to such prior art (No. 5-124629), since quality of the container can be judged by detecting the change of a distance between the surface of the container and a fixed point in a closed system accommodation means after and before reducing a pressure, automatization of the entering air inspection can be attained with sufficient accuracy. As compared with a manner of inspecting all subjects, since a sampling inspection is taken place in this prior art, a pressure reduce means and/or a measuring means can be facilitated in smaller scale, and/or, elimination (automatic elimination) of an inferior container can be made easier.

The above-mentioned leaking liquid inspection apparatus and the entering air inspection apparatus which are disclosed (as in Japanese Patent Applications by the applicant) are very effective. At present, however, the above-mentioned two apparatuses are provided as different apparatuses in an inspection area.

However, responding to desires for simplification and space saving of the inspection area, it is desirable that the leaking liquid inspection apparatus and the entering air inspection apparatus are structured to be provided in the same system to simultaneously facilitate the leaking liquid inspection and the entering air inspection.

SUMMARY OF THE INVENTION

Object of the Invention

One object of the present invention to provide an inspection system which simultaneously facilitates the leaking liquid inspection and the entering air inspection by including therein the leaking liquid inspection apparatus and the entering air inspection apparatus together.

Construction

An inspection system of the present invention includes a leaking liquid inspection apparatus for inspecting a container (which may be made of flexible material) in order to detect a leaking liquid and an entering air inspection apparatus for inspecting the container in order to detect air entering the container with liquid when the container is fed with liquid. A conveyor line for conveying plural containers, first sampling means for moving the container as an inspection subject to a position at which the leaking liquid inspection apparatus is provided. A second sampling means moves the container as an inspection subject to a position at which the entering air inspection apparatus is provided. A first stopper interrupts the container to be the inspection subject at a position of the first sampling means while the container is moving on the conveyor line. A second stopper interrupts the container to be the inspection subject at a position of the second sampling means while the container is moving on the conveyor line. At a third stopper is located at the upstream position from the first and second stopper.

Each of the first and second sampling means has an arm, article hold means provided at the end of the arm, horizontally moving means for moving the arm and the article hold means in a horizontal direction, and vertically turning means for semicircularly turning the arm in a plane of a vertical direction.

It is preferable to move the arm and the article hold means close to and away the container by the horizontally moving means and to move the container in a held state in the article hold means by combined operation of the horizontally moving means and the vertically turning means.

It is preferable that the horizontally moving means has rails oriented at place relative to the movement in the horizontal direction, a movable pedestal reciprocating on the rails, and a piston cylinder system causing the movable pedestal to reciprocate. Additionally, the rails can be defined as a single-line or plural-line. As for the article hold means, it may be considered that its strength of hold is controlled in response to weight of the article. More specifically, a way of holding the article is not intended to be limited. For example, any manner of clamping or gripping the article can be considered. However, when the inspected article is made of fragile material for package, it is preferable to structure a system (a suction member) for holding the article by sucking or adhesion.

It is preferable that each of the first and second sampling means has the arm, the article hold means being provided at the end of the arm, a piston cylinder system provided at the end of the arm to move the article hold means in a horizontal direction, and the vertically turning means for semicircularly turning the arm holding the container in the article hold means in a vertical plane.

When the above-mentioned structure is utilized, it is desirable to provide a security system to maintain steadiness of the whole arm even if an overload acts on the suction members.

Furthermore, an inspection position of the leaking liquid inspection apparatus may correspond with a position at which the container is semicircularly moved in a lengthwise direction from the conveyor line by the vertically turning means of the first sampling means. Similarly, an inspection position of the entering air inspection apparatus may correspond with a position at which the container is semicircularly moved in a lengthwise direction from the conveyor line by the vertically turning means of the second sampling means.

It is desirable for execution of the present invention to have a control means for causing the article conveyed on the conveyor line to undergo the leaking liquid inspection and the entering air inspection by coordinating operation of the first and second sampling means and the first, second and third stopper.

In addition, it is desirable for execution of the present invention to use photocells as various sensors and a motor for the arm as the vertically turning means.

Operation

According to the present invention including the above-mentioned structure, when the container to be the subject for the leaking liquid inspection is conveyed on the conveyor line to reach a position of the first sampling means, the first stopper means operates to interrupt such the container. The first sampling means moves the container interrupted by the first stopper to a position at which the leaking liquid inspection apparatus is provided.

More concretely, the movable pedestal is moved in the horizontal direction toward the conveyor line by means of the piston cylinder system, the article hold means provided at the end of the arm of the first sampling means in order to adhere the container interrupted by the first stopper, and then, the movable pedestal, together with the container, is moved in the horizontal direction away from the conveyor line. Thereafter, the arm holding the container is semicircularly turned 180 degrees in the vertical direction by the vertical turning means, so that the container reaches the inspecting position of the leaking liquid inspection.

After carrying out the leaking liquid inspection in the above-mentioned manner, the container is returned onto the conveyor line in the opposite process to the aforementioned process, and operation of the first stopper means is released.

The entering air inspection is carried out in the same way as the leaking liquid inspection. That is, when the container to be the subject for the entering air inspection reaches a position of the second sampling means, the second stopper means operates to interrupt the container. The second sampling means moves the container to a position at which the entering air inspection apparatus is provided. More concretely, the movable pedestal is moved in the horizontal direction toward the conveyor line in order to adhere the article hold means of the second sampling means to the container, and then, the movable pedestal, together with the container, is moved in the horizontal direction away from the conveyor line. Thereafter, the arm holding the container is semicircularly turned 180 degrees in the vertical direction by the vertical turning means, in order to reach the container to the inspecting position of the entering air inspection.

After carrying out the entering air inspection in the above-mentioned manner, the container is returned onto the conveyor line in line with the opposite process to the aforementioned process, and operation of the second stopper is released.

While the leaking liquid inspection and the entering air inspection are carried out, since the first and second stopper operate, other containers on the conveyor line may be brought to a standstill at the position of the sampling means for the inspection. If the third stopper means is positioned on the upstream side of the first and second stopper and is adapted to operate during the inspections, other new containers are not conveyed from the upstream side while the leaking liquid inspection and the entering air inspection are carried out. Therefore, disadvantages resulting from the containers brought to a standstill at the positions of the sampling means for the inspections are removed.

The leaking liquid inspection and the entering air inspection can be facilitated at the same time and also can be independently facilitated in relation to one another. Therefore, even if one inspection is finished or interrupted, the other inspection can continue.

In the present invention, the subject is moved to the inspecting position by a combination of the movement in the horizontal direction and the semicircular turn on a plane of the vertical direction. Therefore, there is no damage to the subject, resulting from a gap between the conveyor line and the inspecting position (unlike the case where the subject is moved solely in the movement in the horizontal direction). Furthermore, if the subject is moved by the movement of the vertical reverse turn solely and the subject is close to the side of the arm, it is possible that the subject is broken by the suction member in a case that the suction member provided on the end of the arm abuts to the subject.

Consequently, according to the present invention in which the horizontal movement is carried out, when the suction member of the end of the arm abuts to the subject, the arm merely moves in the horizontal direction before turning reversely, and therefore, the subject is prevented from being broken.

Effect

Some of the many operative effects of the present invention are as follows:

(1) The leaking liquid inspection and the entering air inspection can be carried out in the same system reliably.

(2) Simplification and a space-saving for the inspection process can be attained.

(3) It is possible to operate both of the leaking liquid inspection and the entering air inspection at the same time or independently operate the leaking liquid inspection and the entering air inspection.

(4) Although one inspection is finished or interrupted, the other inspection can continue with its operation.

(5) The subject is prevented from being damaged by a gap etc. . ., when being moved from the conveyor line to the inspecting position.

(6) The inspection subject is prevented from being broken when a member such as the arm is reversely turned in the vertical direction.

DETAILED DESCRIPTION

A preferred embodiment according to the present invention will be described with reference to attached drawings below, In FIG. 1, a reference numeral 10 indicates an entire inspection system according to one example of present invention, (the overall details of a leakage liquid inspection apparatus and an entering air inspection apparatus in the inspection system are not illustrated in FIG. 1). The inspection system 10 is accompanied by a conveyor line 12 to convey thereon plural containers W (made of paper, e.g.) in a conveyable direction designated with an arrow R in the drawing. Along the conveyor line 12, adjoining a first sampling means 14 to move the vessel W from the conveyor line 12 to a place at which the leaking liquid inspection apparatus (not-shown in FIG. 1) is provided, there is provided a second sampling means 16 to move the container W from the conveyor line 12 to a place at which the entering air inspection apparatus (not-shown in FIG. 1) is provided.

At a position just before the first sampling means 14 on the conveyor line 12, a first stopper 18 is provided to interrupt the containers W moving on the conveyor line 12. Similarly, at a position before the second sampling means 16, a second stopper 20 is provided.

Furthermore, a third stopper 22 is provided at a position upstream (direction) from the aforementioned first and second stoppers 18, 20 (or the first and second sampling means 14, 16).

The first sampling means 14 and the second sampling means 16 are respectively adapted to reciprocate on a pair of rails 24, 26 and a pair of rails 28, 30, in direction shown with the arrow A, by piston cylinder systems for moving pedestals (air cylinders) 32, 34. Again the first and second sampling means 14, 16 having respectively movable pedestals 36, 38, arms 40, 42 turning semicircularly 180 degrees (or moving in a reverse turn) in a vertical plane (a plane perpendicular to paper on which FIG. 1 is illustrated) and article hold means (suction members) 44, 46 are respectively provided to the ends of these arms 40, 42. Each of the suction members 44, 46 includes a convenient structure to hold the container W by means of suction or adhesion. And, all the rails 24, 26, 28, 30, the air cylinders for moving pedestals 32, 34 and the movable pedestals 36, 38 form horizontally moving means to move the arms and the article hold means in a horizontal direction. Incidentally, vertically turning means, to turn the arms 40, 42 holding the containers W with the article hold means (the suction members) 44, 46 in a vertical plane.

Suction force or negative force produced by the suction members 44, 46 is defined in a range capable of reliably holding the container W by suction without damage to the container W.

As shown in the drawing, instead of the air cylinders for moving pedestals 32, 34, air cylinders are provided between the arms 40, 42 and the article hold means (the suction members) 44, 46 to cause the suction members 44, 46 to be capable of extending in a lengthwise direction of the arms 40, 42. Incidentally, it is suitable to provide a security system (not-shown) to induce steadiness to the suction members 44, 46 even if an overload acts on the suction members 44, 46.

As for the leaking liquid inspection apparatus, an inspecting position of the leaking liquid inspection apparatus corresponds to a position at which the container W is reversely turned in a lengthwise direction from the conveyor line 12 by the arm 40 of the first sampling means 14. Similarly, an inspecting position of the entering air inspection apparatus corresponds to a position at which the container W is reversely turned in a lengthwise direction from the conveyor line 12 by the arm 42 of the second sampling means 16.

The third stopper 22 is extended by an air cylinder 48 for operating the stopper (the third stopper). More specifically, when the stopper 22 is extended by the air cylinder 48, the third stopper 22 interrupts to press the flowing container W against a side wall 12w (shown with two-dot chain line in FIG. 1) of the conveyor line 12. Therefore, the vessels W flowing behind the interrupted container W are interrupted by the container interrupted to be pressed against the side wall 12w.

Figure 2:
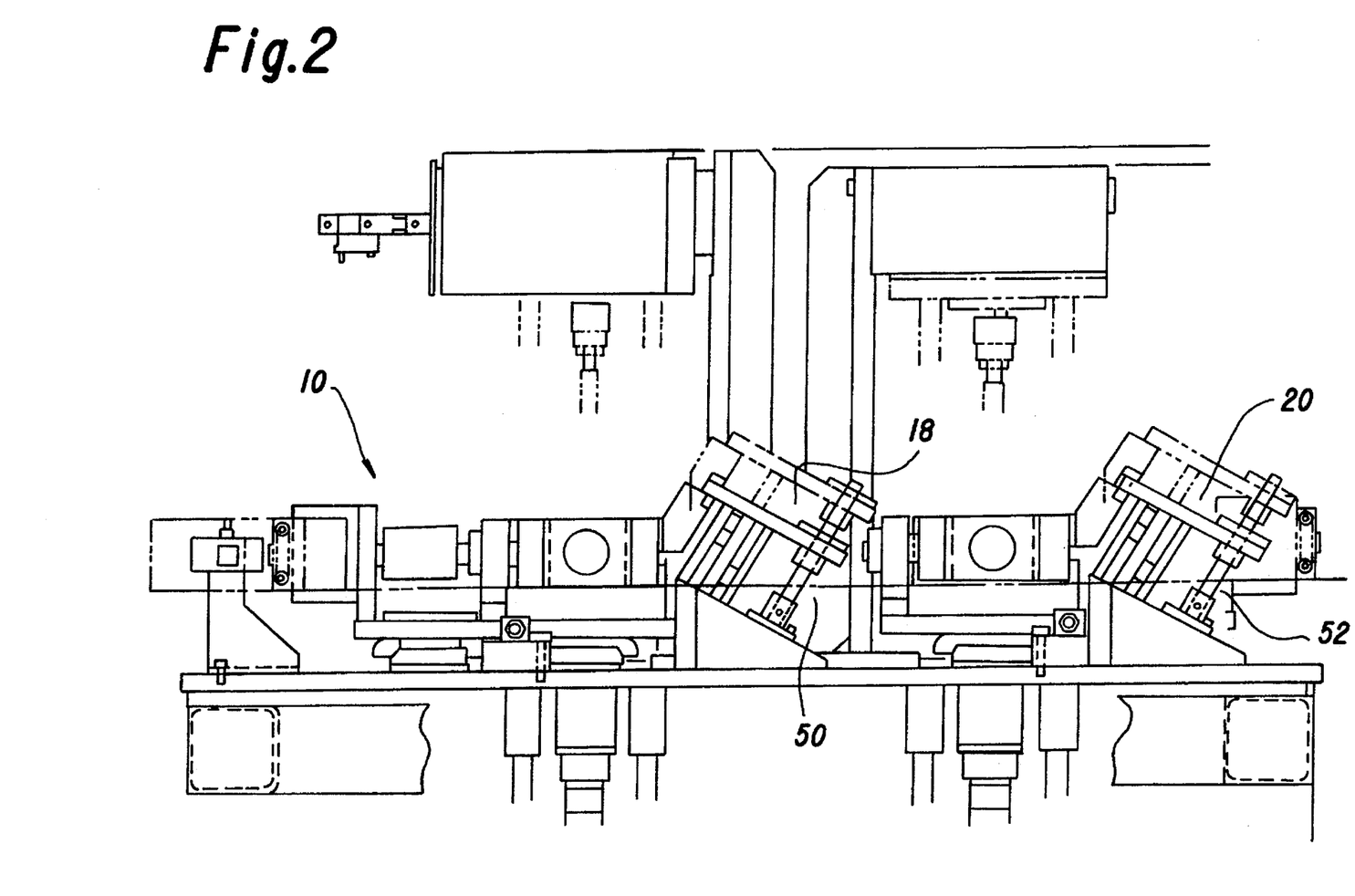
FIG. 2 is a fragmentary enlarged front view of the embodiment of FIG. 1.

As shown in FIG. 2, the first stopper 18 is operated by extension of an air cylinder 50 for operating the first stopper. More specifically, shortening the air cylinder 50, the first stopper 18 extends down toward the conveyor line 12 to interrupt the flowing containers W. On the other hand, extending the air cylinder 50, the stopper 18 lifts up from the conveyor line 12 to await at a position so as not to interrupt the flowing vessels W. Similarly, the second stopper 20 is worked by extension of an air cylinder 52 for operating the second stopper.

Operation of the embodiment of FIGS. 1 and 2 will be explained with reference to FIG. 3 to 14. In FIG. 4 to 14, the first sampling means 14 and the second sampling means 16 have the same operation excluding a point at which the container W is moved to the position of the leaking liquid inspection apparatus or a point which the container W is moved to the entering air-inspection apparatus. Thus, only the operation of the first sampling means 14 is shown. Incidentally, in FIG. 4 to 14, reference symbol C shows a position at which the leaking liquid inspection apparatus is provided. (But, considering the manner of operating the second sampling means 16, the reference symbol C should be understood to show a position at which the entering air inspection apparatus is provided).

Figure 1:
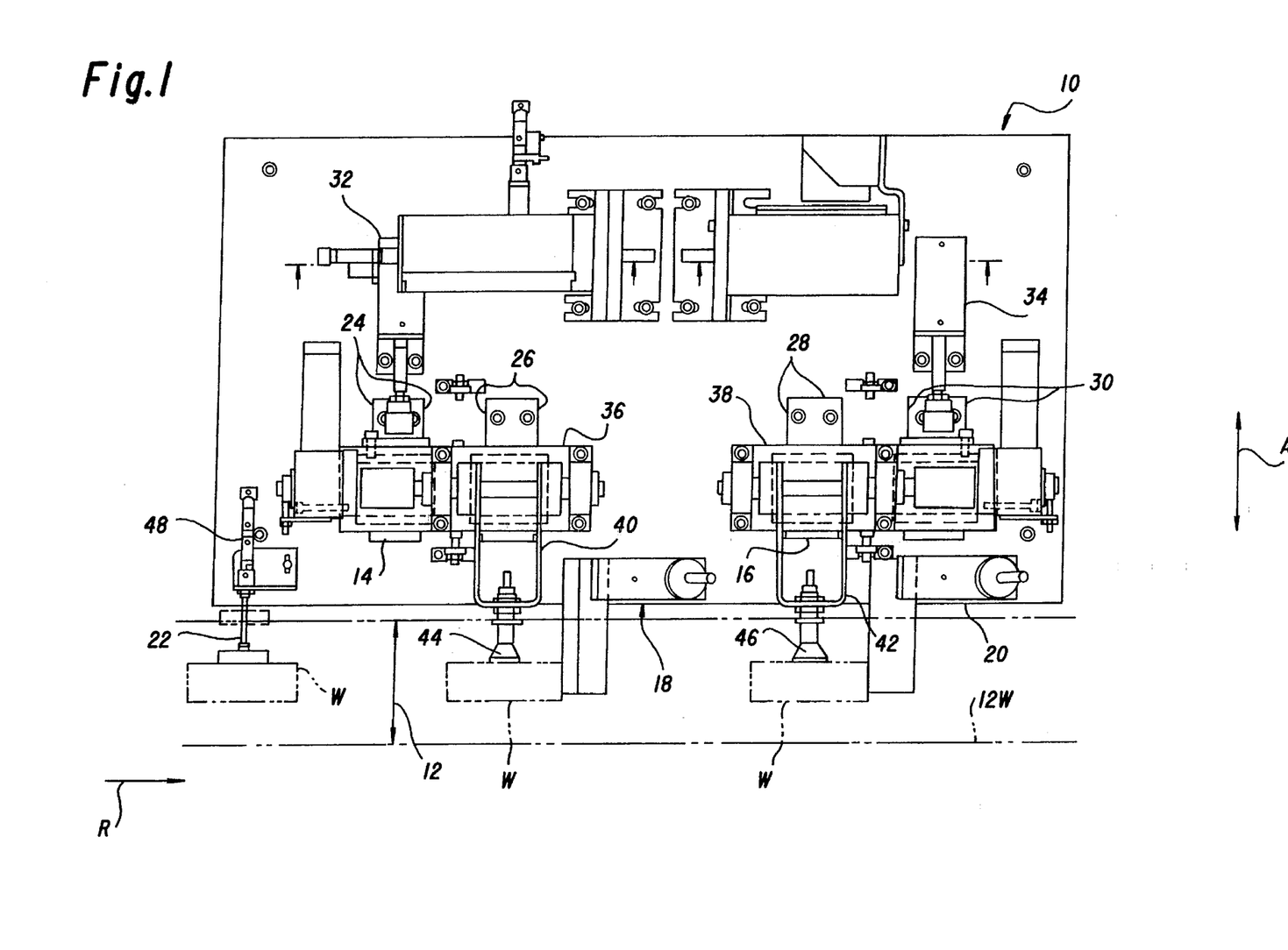
FIG. 1 is a plane view of the preferred embodiment according to the present invention.
Figure 3:
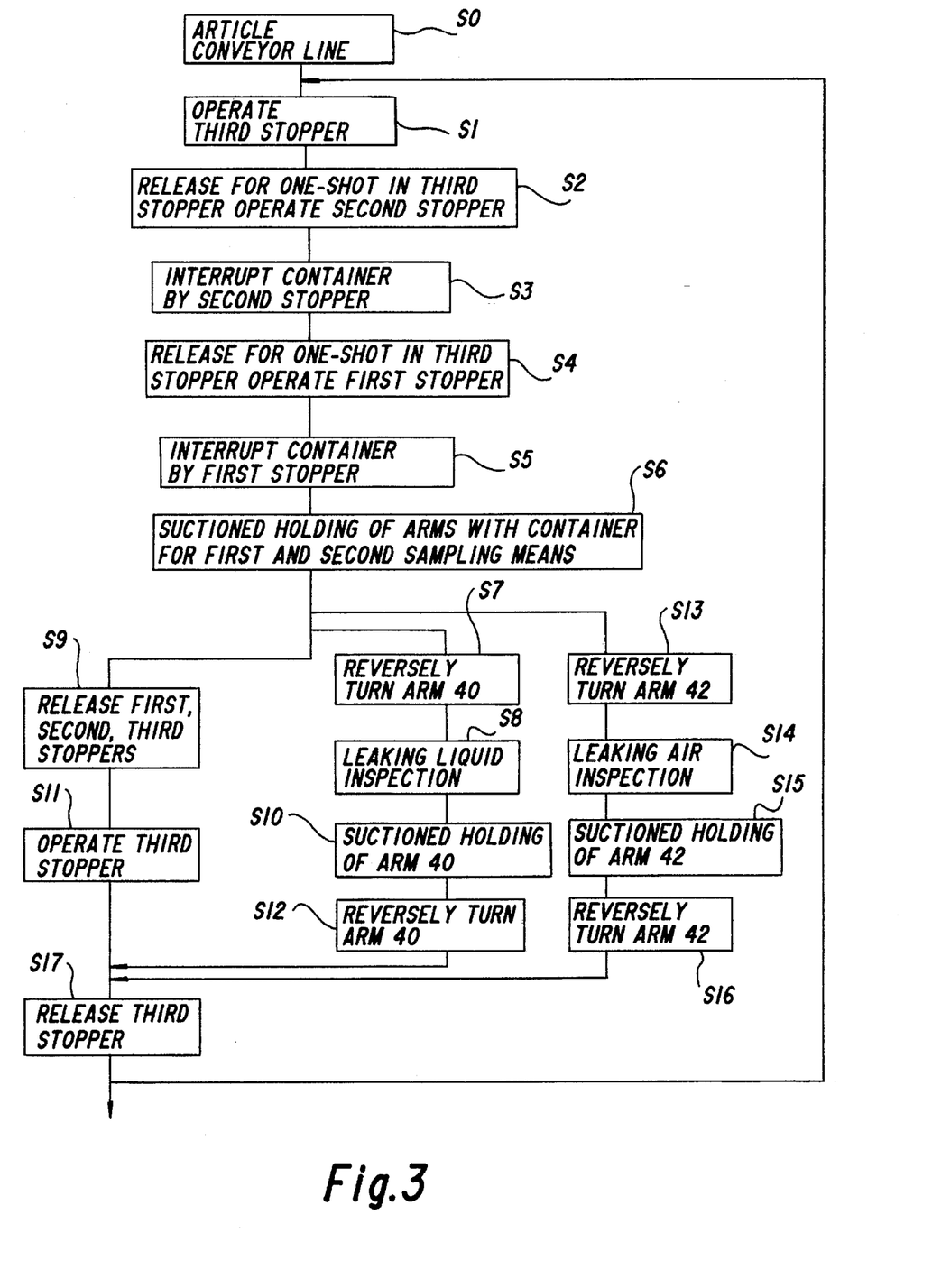
FIG. 3 is a flowchart of a control form according to the embodiment of FIG. 1.

On the conveyor line 12 for the container W in FIG. 1, plural vessels W are conveyed (step S0 in FIG. 3). In this state, the containers W in the upstream (in the left side of FIG. 1) from the position of the third stopper 22 are interrupted by the third stopper 22 extended downwards by the air cylinder 48 (step S1).

Next, the air cylinder 48 is retracted and extended again in order to cause the third stopper 22 to pass only one container W (one-shot). In response to this conveyance of only one container W by the third stopper 22, the air cylinder 52 lifts the second stopper 20 down in the conveyor line 12 (step S2). As a result, the container W is interrupted at a position before the second sampling means 16 by the second stopper 20 (step S3).

Figure 4:
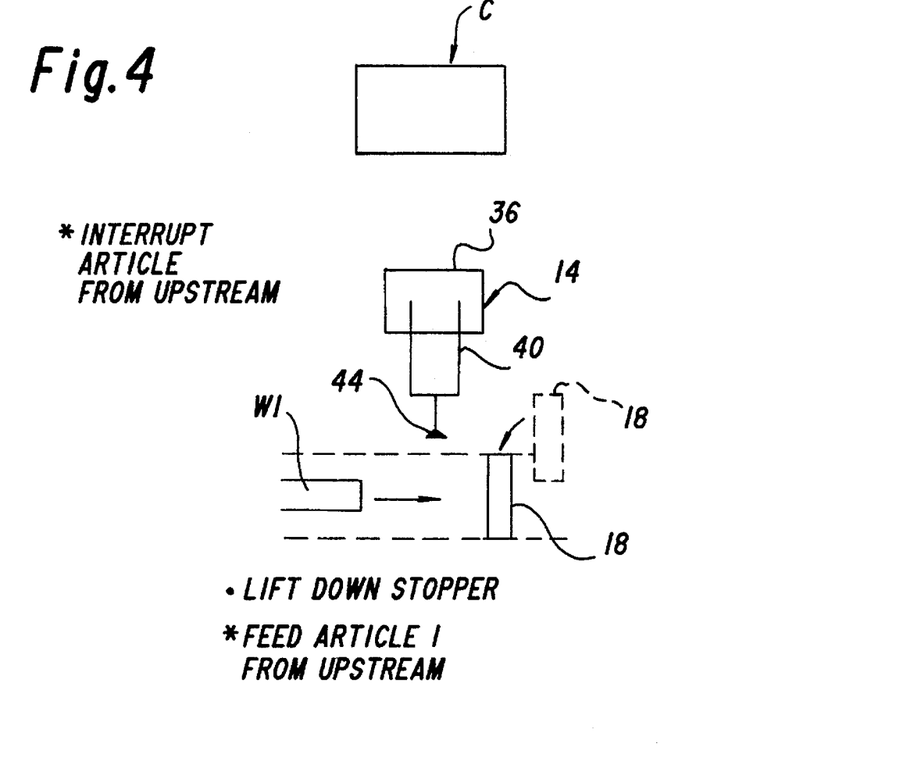
FIG. 4 is a fragmentary block diagram of processes of the control form of FIG. 3.
Figure 5:
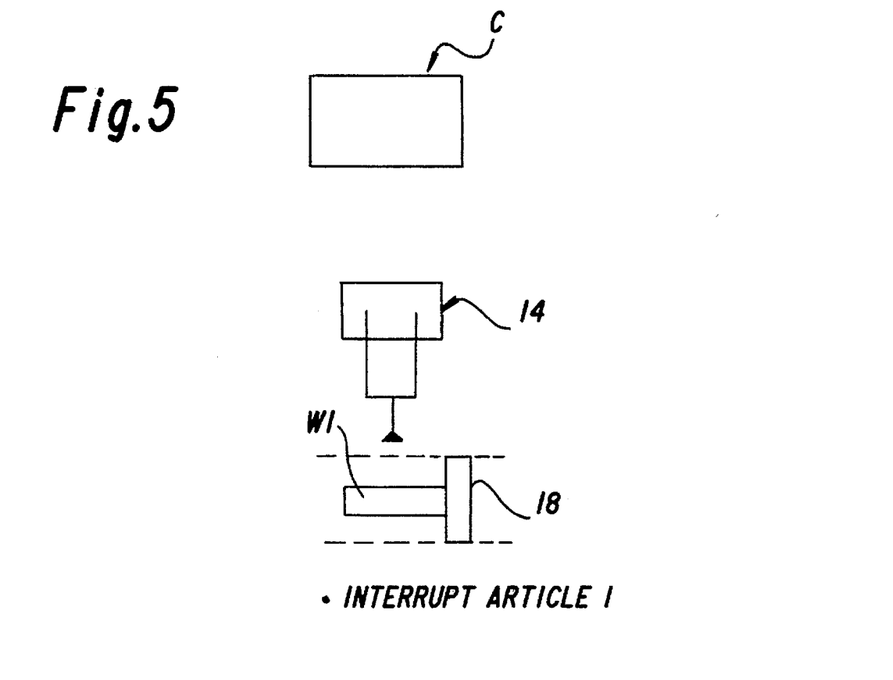
FIG. 5 is a block diagram of other processes than processes of FIG. 4.
Figure 6:
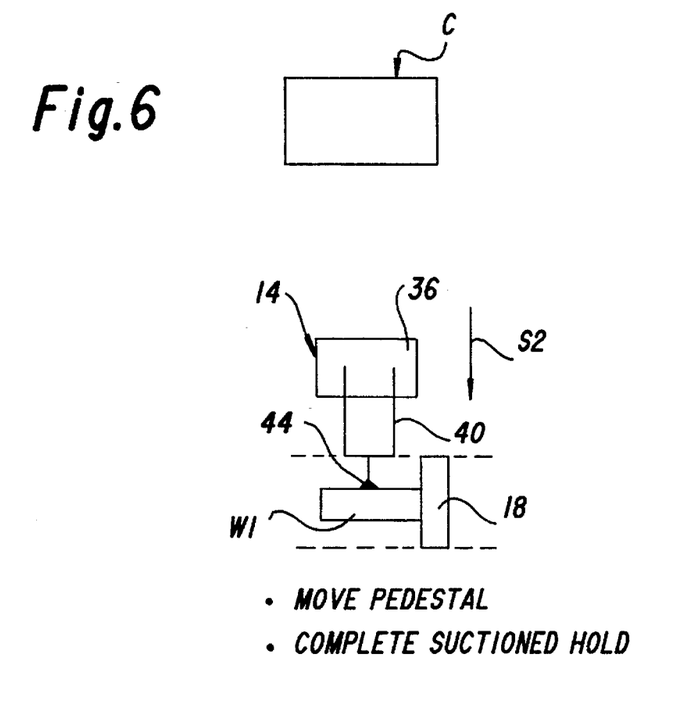
FIG. 6 is a block diagram of other processes than processes of FIG. 4 and FIG. 5.

Furthermore, another container (a container shown with reference symbol W1 in FIG. 4) is conveyed downstream for one-shot by the third stopper 22. At the same time, the first stopper 18 is operated by the air cylinder 50 as shown in FIG. 4 (step S4), and the container W1 is interrupted as shown in FIG. 5 (step S5).

In this step, the containers W1 and W respectively stop at positions before the first and second sampling means 14, 16. Next, the air cylinder 32, 34 are extended to move the movable pedestals 36, 38 toward the conveyor line 12 in order to cause the suction members 44, 46 respectively provided at the end of the arms 40, 42 to adhere and suck the sides of the containers W1, W to hold the containers W1, W (step S6 in FIG. 6). If a reverse turn movement for H1 is carried out at this stage (step S6) shown in FIG. 6, the container W1 will be likely to be damaged by the arm 40 and the suction member 44. However, as the embodiment shown in the drawings, at this stage the suction member 44 of the end of the arm moves only in a horizontal direction, as shown with an arrow S2 in FIG. 6 to abut to the side of the container W1 and (the arm 40 does not yet move reversely in the vertical direction, so that the containers W1 are not broken).

Explanation of the first sampling means 14 is given here. The air cylinder 32 is shortened to cause the movable pedestal 36 to move in horizontal direction toward an arrow S1 side, and the arm 40 is reversely turned in the vertical direction with the container W1 as shown with the arrow H1 (step S7 in FIG. 7).

Figure 7:
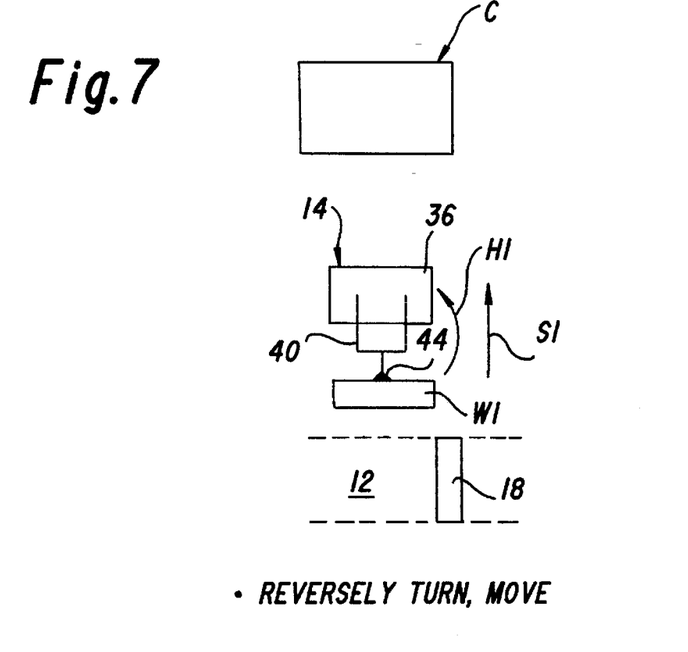
FIG. 7 is a block diagram of other processes than processes from FIG. 4 to FIG. 6.
Figure 8:
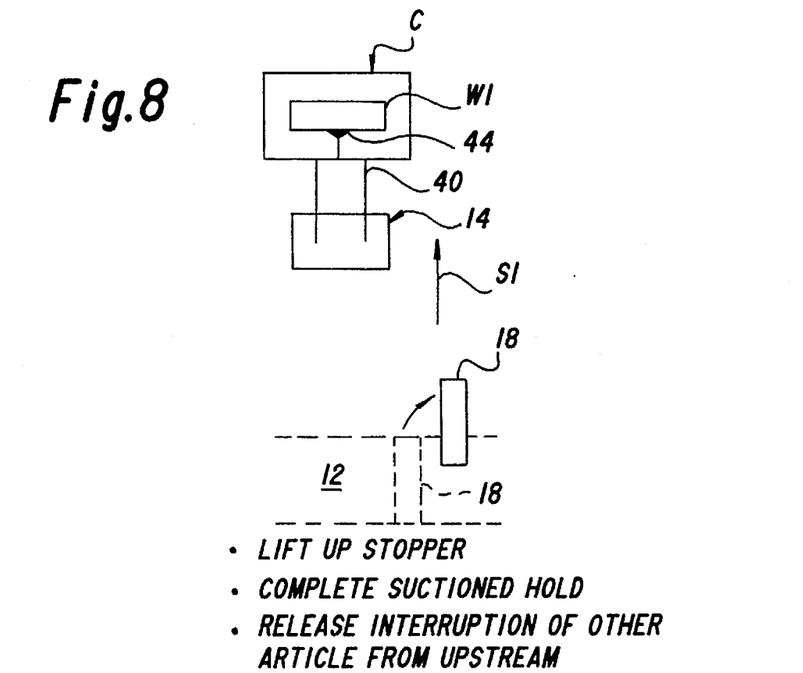
FIG. 8 is a block diagram of other processes than processes from FIG. 4 to FIG. 7.
Figure 9:
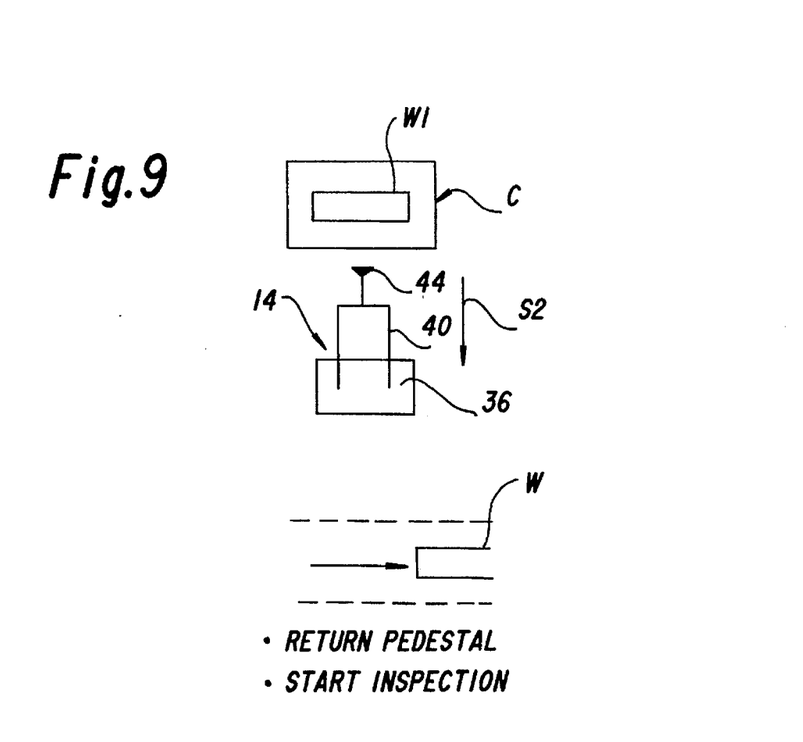
FIG. 9 is a block diagram of other processes than processes from FIG. 4 to FIG. 8.
Figure 10:
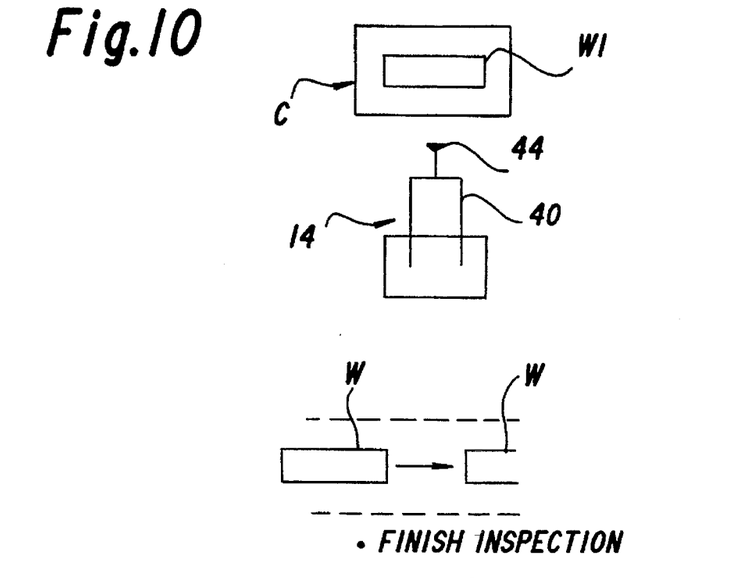
FIG. 10 is a block diagram of other processes than processes from FIG. 4 to FIG. 9.

Therefore, as compared with solely moving in the horizontal direction S1, the movement in the horizontal direction shown with the arrow S1 and the reverse turn movement in the vertical direction shown with the arrow H1 (a turn in a plane of a direction perpendicular to paper illustrating FIG. 7) are used together so that the subject W1, is unlikely to be damaged by a gap (not-shown) between the conveyor line 12 and the inspection position C.

The arm 40 holding the container W1 reversely turns in the vertical direction to cause the container W1 to reach the inspecting position C (see FIG. 8), so that when the container W1 reaches the inspecting position C, the movable pedestal 36 moves in a direction of the arrow S2 to separate the suction member 44 from the container W1. Immediately, therefore, the leaking liquid inspection for the container starts (steps S8 in FIG. 9). During the leaking liquid inspection for the container W1 (step S8), the first, second and third stopper 18, 20 and 22 are moved back to a predetermined initial position or are released to not interrupt conveyance of other containers (step 9), so that other containers W behind the container W1 flow smoothly on the conveyor line 12 (see FIG. 9, FIG. 10).

Figure 11:
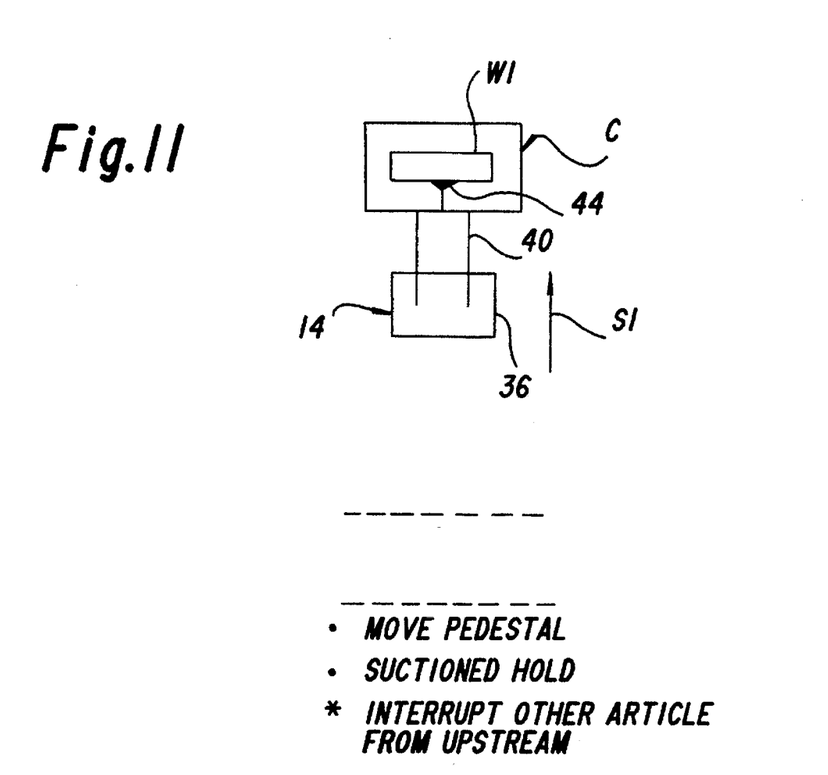
FIG. 11 is a block diagram of other processes than processes from FIG. 4 to FIG. 10.
Figure 12:
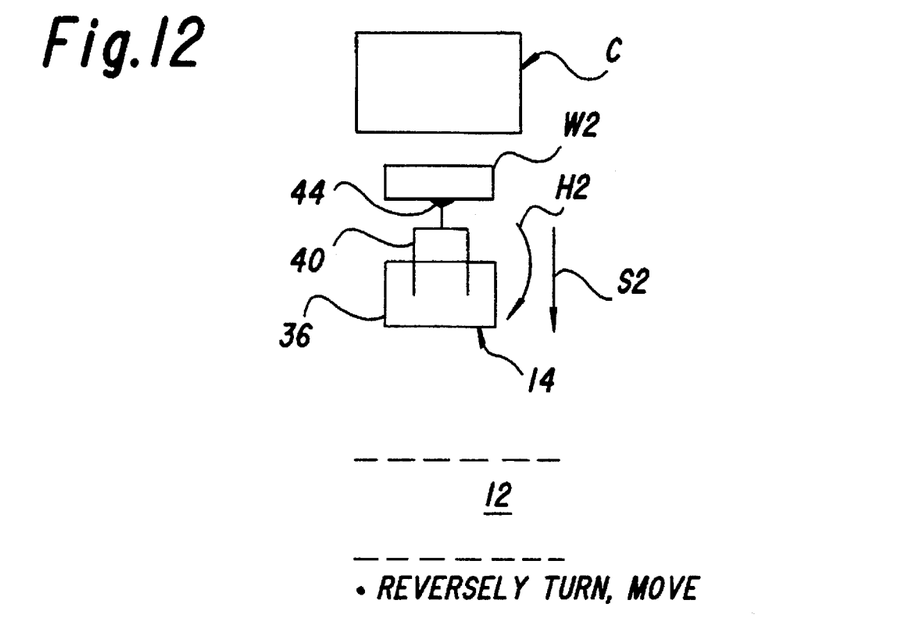
FIG. 12 is a block diagram of other processes than processes from FIG. 4 to FIG. 11.
Figure 13:
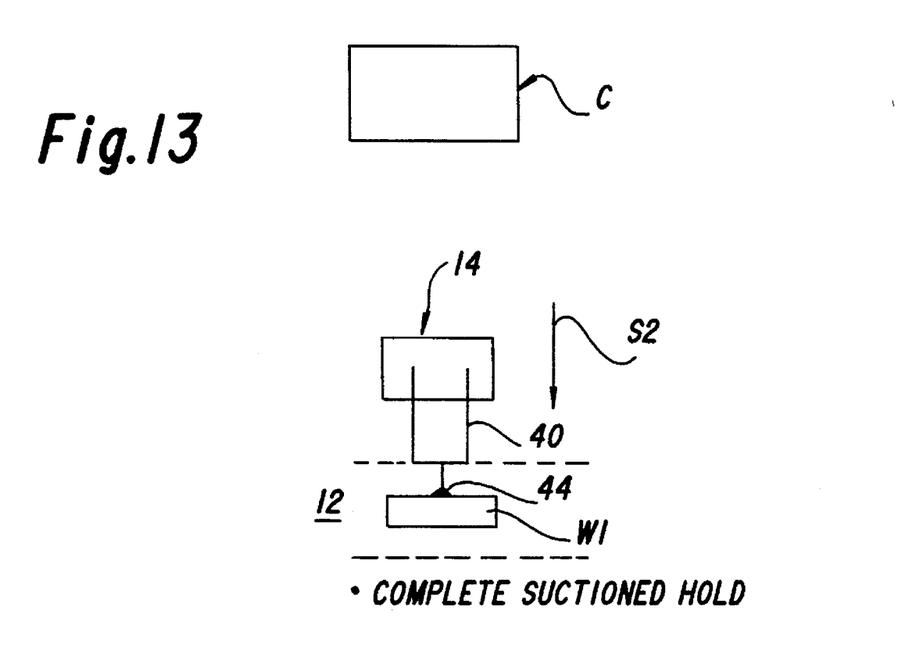
FIG. 13 is a block diagram of other processes than processes from FIG. 4 to FIG. 12.
Figure 14:
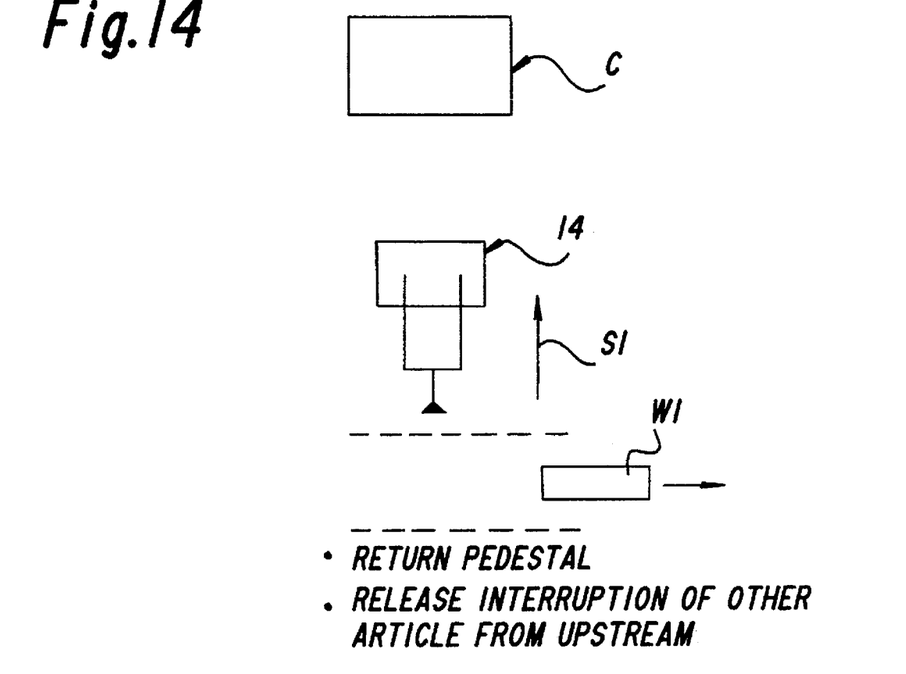
FIG. 14 is a block diagram of other processes than processes from FIG. 4 to FIG. 13.

After completing the leaking liquid inspection (FIG. 10), the movable pedestal 36 moves in a direction of the arrow S1 to cause the suction member 44 to adhere to the container W1 for suctioned hold (step S10 in FIG. 11). In this step, the third stopper 22 is operated to interrupt conveyance of other containers on the conveyor line 12 (step 11). The arm 40 holding the containers W1 is semicircularly moved to place the vessel W1 down (an arrow H2) while being moved in the horizontal direction (the arrow S2) toward the conveyor line 12 (step S12 in FIG. 12). The container W1 is released from the suctioned holding of the suction member 44 when reaching the conveyor line 12 (FIG. 13), and the first sampling means 14 moves in the horizontal direction toward the arrow S1 to return to its initial position (the position shown in FIG. 4) (FIG. 14).

On the other hand, the second sampling means 16 has the almost same processes after the Step S6 as the first sampling means 14. That is, the movable pedestal 38 moves in the horizontal direction to the side of the inspecting position while the arm 42 is reversely turned in the vertical direction (step S13), and the entering air inspection takes place (step S14). During the entering air inspection for container W, all the first, second and third stopper 18, 20 and 22 are released, as in the case of step S8 (step S9), and after completing the entering air inspection, the suction member 42 holds the container W to adhere and suck again (step S15). The third stopper 22 is operated (step S11), and the arm 42 holding the container W is semicircularly moved to place the container W down while the movable pedestal 38 is moved in the horizontal direction toward the conveyor line 12 (step S16) in order to return the container W onto the conveyor line 12.

When both the first and second sampling means 14, 16 respectively return the container W1, W onto the conveyor line 12, the third stopper 22 releases interruption for conveyance of other containers W (step S17).

After this, the cycle of the process described above is repeated.

Figure 15:
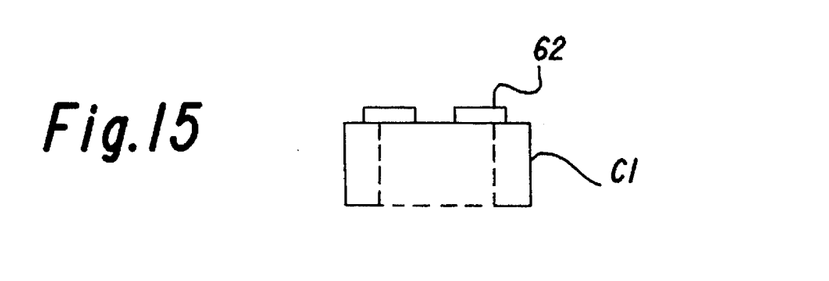
FIG. 15 is a plane view of a position definition means for an inspection position.
Figure 16:
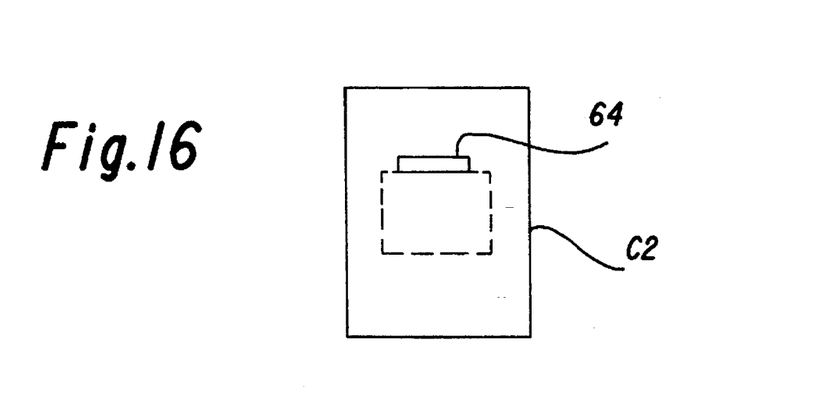
FIG. 16 is a plane view of other position definition means different from the means of FIG. 15.

Incidentally, an air spray port may be provided at the downstream of the third stopper 22 (in the right side of FIG. 1) to blow away water-drops wetting on the surface of the container W by air gushing out therefrom. The air spray port is provided in order to prevent wrong operations in the leaking liquid inspection apparatus as will be described below. As shown in FIG. 15 and FIG. 16 (a plane view), it is preferable that stoppers for defining a position are respectively provided to an inspecting position C1 for the leaking liquid inspection and an inspecting position C2 for the entering air inspection.

The drawings do not illustrate clearly, but when fault is found by the leaking liquid inspection or the entering air inspection, the faulty container is removed out of the flow at a position where the faulty container reaches downstream of the second stopper 20. If the fault occurs twice continually, the third stopper 22 is worked to stop the flow of the conveyor line 12.

Now, explanation is given concerning the leaking liquid inspection apparatus and the entering air inspection apparatus.

The air entering inspection apparatus automatically detects whether air enters a vessel, in an operation in which various drinks, such as a lactic acid substance or the like, are fed into the vessel. The vessel may be made of a flexible material, such as paper or the like.

The vessel is placed within a decompression chamber. A sensor including a sensor head, measures a distance up to the vessel by projecting a laser beam. More specifically, the laser beam detects a distance from the sensor head to a side face of the vessel.

When the pressure inside a decompression chamber is reduced, the side face 14m is not expanded if air has not entered the vessel. This can be detected since the distance between the sensor head and the side face of the vessel does not change. On the other hand, if air has entered the vessel, the vessel expands when the pressure inside of the decompression chamber is reduced.

The leaking liquid inspection apparatus automatically detects whether liquid leaks from a vessel. The stationary vessel is accommodated in the chamber. A piston of a pressure cylinder is extended to press the vessel by using a pressing member provided at the end of the piston. That is, if liquid leaks from the vessel, the liquid spreads over an inner wall face of the chamber and an electrode board (provided on the wall of the chamber). The liquid provides an electrical connection between two electrodes of the electrode board, energizing both electrodes. As a result, an indicator or alarm is activated because of the closing of the circuit.

Of course, different types of air entering inspection apparatus and leaking liquid inspection apparatus may be utilized in the preferred embodiment of the invention.

Figure 17:
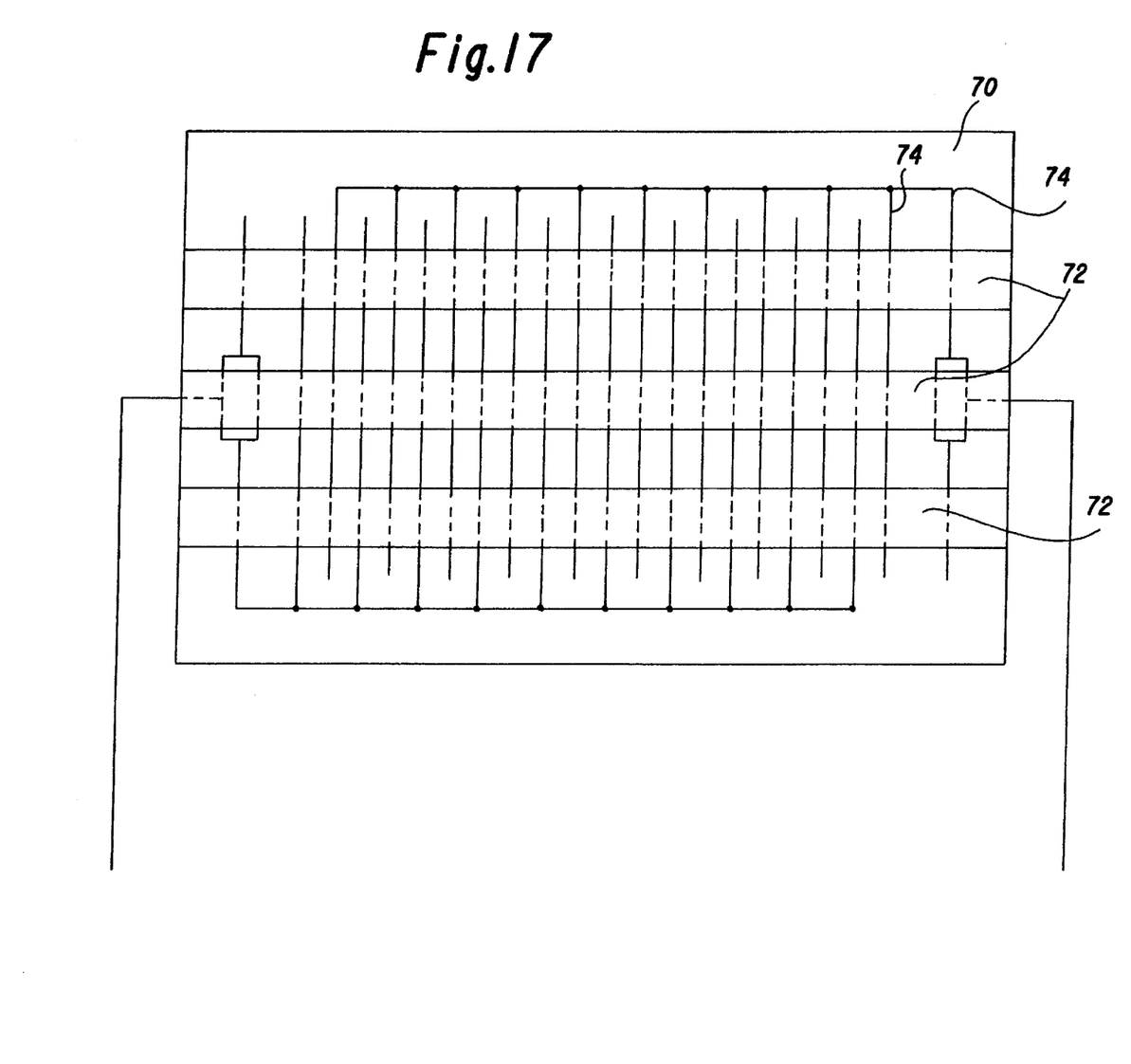
FIG. 17 is a fragmentary plane view of a leaking liquid inspection apparatus.
Figure 18:
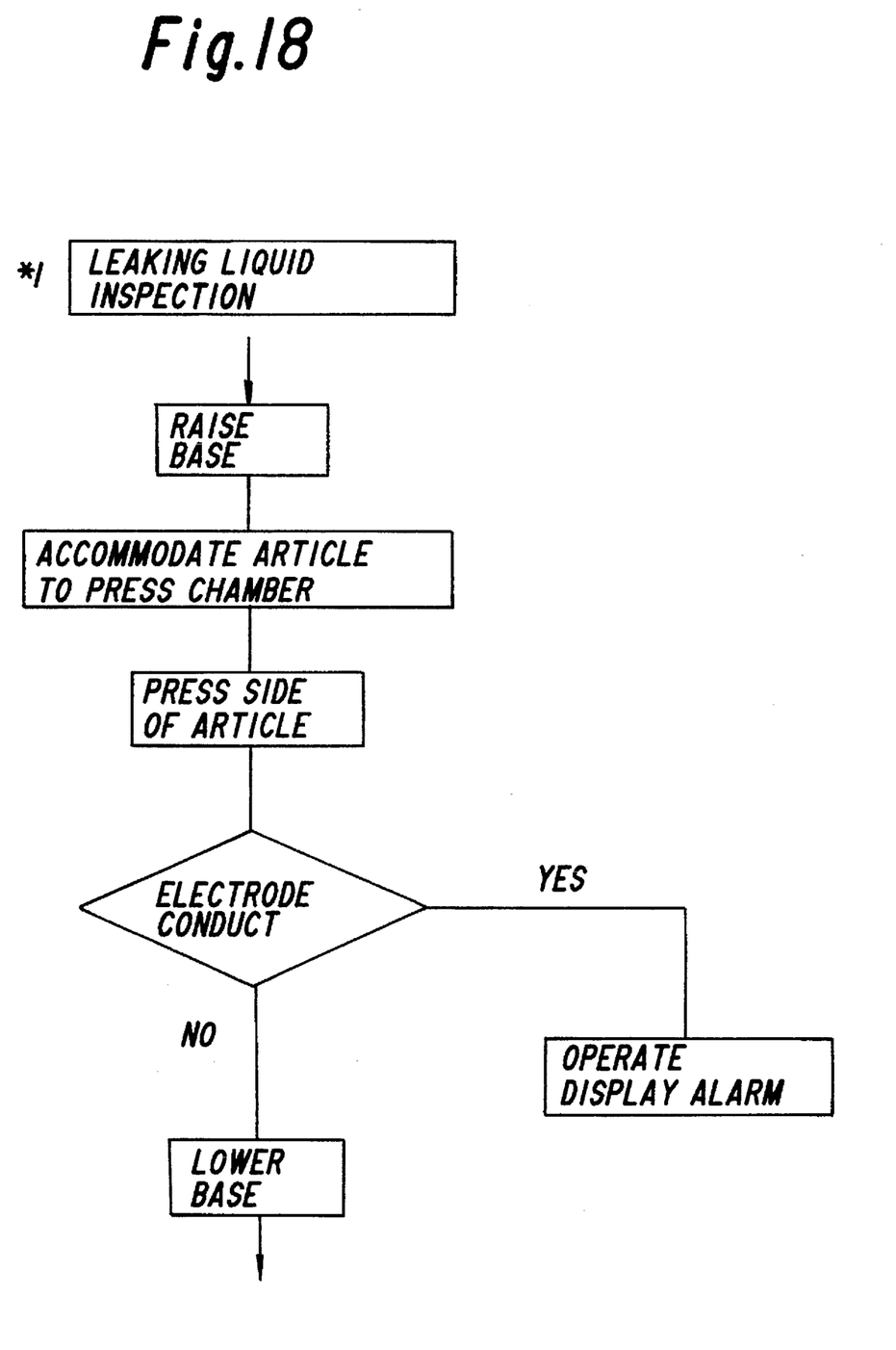
FIG. 18 is a flowchart of a leaking liquid inspection.

The leaking liquid inspection apparatus is the almost same as apparatus disclosed by Japanese Patent Application Disclosure No. 5-124628, but as shown in FIG. 17, there is a different point which plural slender insulating members 72 are positioned on an electrode plate 70. The slender member 72 prevents the containers W, W1 from directly touching an electrode 74. As for process of the inspections illustrated with a flowchart in FIG. 18, the different point is cited as difference on expression mainly but the technical contents is the same as contents disclosed by Japanese Patent Application Disclosure No. 5-124628.

Figure 19:
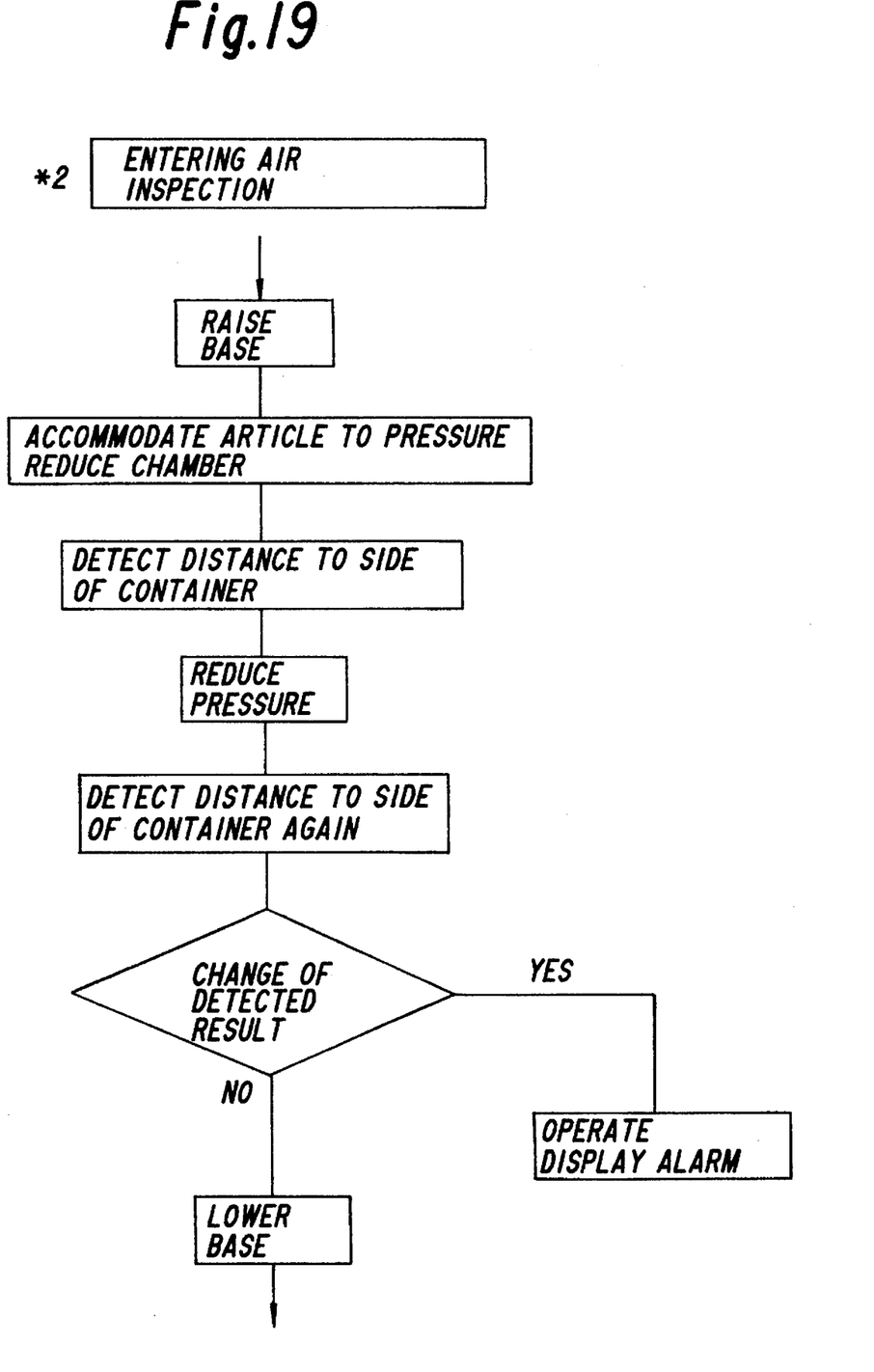
FIG. 19 is a flowchart of an entering air inspection.

FIG. 19 illustrates a flowchart of inspection carried out in the entering air inspection apparatus. The entering air inspection apparatus is the same as an apparatus disclosed by Japanese Patent Application Disclosure No. 5-124629 except the difference in expression.

Incidentally, although particular preferred embodiments of the invention have been disclosed as detailed examples, it is emphasized that the present invention is not intended to be limited to the above-described technical contents.

We claim:

1. An inspection system that quality inspects a contents-filling operation for each of a plurality of containers in sequence by performing two different inspection tests at two separate testing positions disposed along a single automated conveyor line, comprising:

a leaking liquid inspection apparatus for inspecting a container made of flexible material, in order to detect leaking liquid;

an entering air inspection apparatus for inspecting said container, in order to detect air which enters with contents of the container when the container is filled with said contents;

a conveyor line for conveying a plurality of containers;

first sampling means for moving the container as an inspection subject to a position, at which position said leaking liquid inspection apparatus is provided;

second sampling means for moving the container as an inspection subject to a position, at which position said entering air inspection apparatus is provided;

first stopper means for interrupting the container which is to be the inspection subject at the position of said first sampling means while the container is moving on said conveyor line;

second stopper means for interrupting the container which is to be the inspection subject at the position of said second sampling means while the container is moving on said conveyor line; and a third stopper located at the upstream position from said first and second stopper means.

2. The inspection system according to claim 1, wherein each of said first and second sampling means includes an arm, article hold means provided at the end of said arm, horizontally moving means for moving said arm and said article hold means in a horizontal direction, and vertically turning means for semicircularly turning said arm in a vertical plane, wherein said arm and said article hold means are moved close to and away from the container by said horizontally moving means, and the container is moved in a held state in said article hold means, by combined operation of said horizontally moving means and said vertically turning means.

3. The inspection system according to claim 2, wherein said horizontally moving means includes:

a pair of rails, extending in a longitudinal direction corresponding to the direction of movement of said horizontally moving means, a movable pedestal reciprocating on the rails, and a piston cylinder system, by means of which said movable pedestal is reciprocated.

4. The inspection system according to claim 1, wherein each of said first and second sampling means has an arm, article hold means provided at the end of said arm to move said article hold means in a horizontal direction, and vertically turning means for semicircularly turning said arm holding the container with said article hold means on a vertical plane.

5. The inspection system according to any one of claims 2, 3 or 4, wherein:

an inspecting position of said leaking liquid inspection apparatus corresponds with a position of the container, to which position such the container has been semicircularly moved from said conveyor line by means of said vertically turning means of said first sampling means, and an inspecting position of said entering air inspection apparatus corresponds with a position of the container, to which position such the container has been semicircularly moved from said conveyor line by means of said vertically turning means of said second sampling means.

6. The inspecting system according to any one of claims 1, 2, 3 or 4, further comprising:

control means for controlling said first and second sampling means, said first, second and third stopper means, so as to co-operate together and to make the article conveyed on the conveyor be inspected by the leaking liquid inspection and the entering air inspection.

7. An inspection system according to claim 1, wherein said first and second sampling means move the container to said leaking liquid inspection apparatus and said entering air inspection apparatus, respectively, and move the container to said conveyor after testing is completed.

* * * * *